March 10, 1970 G. FISCHER 3,500,136

CONTACT STRUCTURE FOR SMALL AREA CONTACT DEVICES

Filed Jan. 24, 1968 2 Sheets-Sheet 1

INVENTOR.
GERHARD FISCHER

BY

OSTROLENK, FABER, GERB & SOFFEN
ATTORNEYS

March 10, 1970 G. FISCHER 3,500,136

CONTACT STRUCTURE FOR SMALL AREA CONTACT DEVICES

Filed Jan. 24, 1968 2 Sheets-Sheet 2

INVENTOR.
GERHARD FISCHER
BY
OSTROLENK, FABER, GERB & SOFFEN
ATTORNEYS

United States Patent Office 3,500,136

Patented Mar. 10, 1970

3,500,136
CONTACT STRUCTURE FOR SMALL AREA CONTACT DEVICES

Gerhard Fischer, Redondo Beach, Calif., assignor to International Rectifier Corporation, El Segundo, Calif., a corporation of California Filed Jan. 24, 1968, Ser. No. 700,093
Int. Cl. H01l *1/14*
U.S. Cl. 317—234 5 Claims

ABSTRACT OF THE DISCLOSURE

An elongated contact spring is transversely segmented into a plurality of parallel segments, each consisting of three separate elements which have free, deflectable rods. A semiconductor wafer is placed on the center element of each of the groups of three elements and inwardly projecting tangs from the sides of the outer two elements are pressed into engagement with a main electrode and control electrode, respectively, on the upper surface of the respective wafers. The strip is then placed in a furnace and the wafers are soldered to their respective elements. The wafer portions are then encapsulated, and the groups of three elements for each wafer are separated from one another.

This invention relates to a novel contact structure for semiconductor devices, and more particularly relates to a novel spring contact arrangement which can receive a plurality of semiconductor wafers which can be simultaneously processed in application of electrodes, and encapsulation.

It is a primary object of this invention to provide a highly economical arrangement for applying contacts to semiconductor devices which permits the simultaneous handling of a plurality of devices.

Another object of this invention is to provide a novel spring contact arrangement for semiconductor devices which makes optimum use of the spring contact material.

These and other objects of this invention will become apparent from the following description when taken in connection with the drawings in which.

Figure 2:
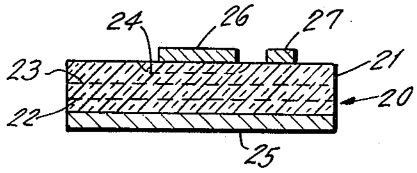
FIGURE 2 is a cross-sectional view of FIGURE 1 taken across section lines 2—2 in FIGURE 1, where the device is a controlled rectifier.
Figure 1:
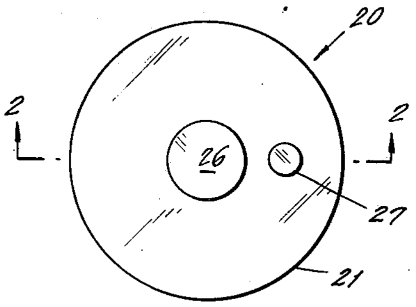
FIGURE 1 is a top view of a typical semiconductor wafer to be contained in the novel spring contact of the invention.

Referring first to FIGURES 1 and 2, there is shown a controlled rectifier device 20 constructed in any desired manner, and comprised of a semiconductor wafer 21 having three junctions 22, 23 and 24 therein. A bottom anode electrode 25 extends across the bottom of wafer 20 and a cathode electrode 26 and a gate electrode 27 are constructed to the upper surface of wafer 21. Typically, wafer 21 may have a thickness of 15 mils and a diameter of about ⅛ inch. Wafer 21 may have a square configuration. Electrodes 25, 26 and 27 may have a thickness of about 2 mils.

Figure 3:
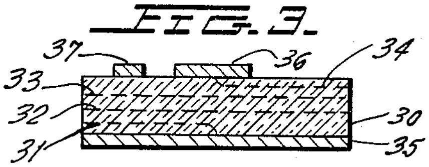
FIGURE 3 shows the configuration of a Triac which can replace the device of FIGURES 1 and 2.

The device could also take the form of a Triac, as shown in FIGURE 3, where the device is comprised of a wafer 30 having junctions 31, 32, 33 and 34 therein with main electrodes 35 and 36 and control electrode 37. The dimensions of the device of FIGURE 3 are similar to those of FIGURES 1 and 2.

The present invention is directed to a novel contact means for making contact to electrodes 25, 26 and 27 of FIGURES 1 and 2, or electrodes 35, 36 and 37 of FIGURE 3.

Figure 4:
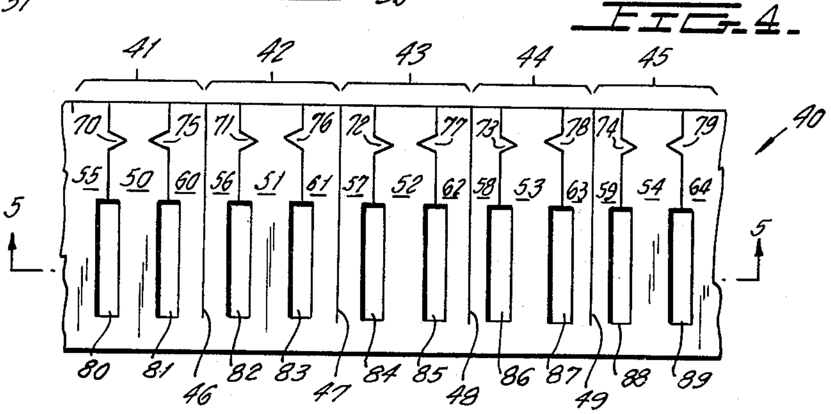
FIGURE 4 shows a top plan view of the contact strip constructed in accordance with the invention.
Figure 5:
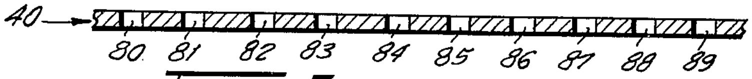
FIGURE 5 is a cross-sectional view of FIGURE 4 taken across the section line 5—5 in FIGURE 4.

FIGURES 4 and 5 show a contact strip 40, constructed in accordance with the invention of a sheet of phosphor-bronze spring-type material having a thickness of from 3 to 20 mils, a width of about 1 inch, and any desired length, such as 6 inches, depending on the number of devices to be formed on a single contact sheet.

Sheet 40 is then stamped to form a plurality of groups of parallel disposed contact elements, shown as elements 41 to 45, each defined between through cuts 46, 47, 48 and 49 of FIGURE 4 which extend across the width of strip 40 to about ¼ inch of the bottom of strip 40. Each of groups 41 to 45 may have a width of about ⅜″ and are further stamped into three separate segments such as central segments 50 to 54, respectively, left-hand segments 55 to 59, respectively, and right-hand segments 60 to 64, respectively. Left-hand segments 55 to 59 each have laterally extending tips 70 to 74, stamped from their respective central portions 50 to 54, respectively. Similarly, right-hand segments 60 to 64 have tips 75 to 79, respectively, stamped from their central portions 50 to 54, respectively. In order to increase the flexibility of the individual segments relative to one another and to insure their electrical separation from one another, enlarged cuts 80 to 89 are formed at the lower portions between the left- and right-hand segments and their respective central segments.

Note that the strip is symmetric in the direction of its length.

Figure 6:
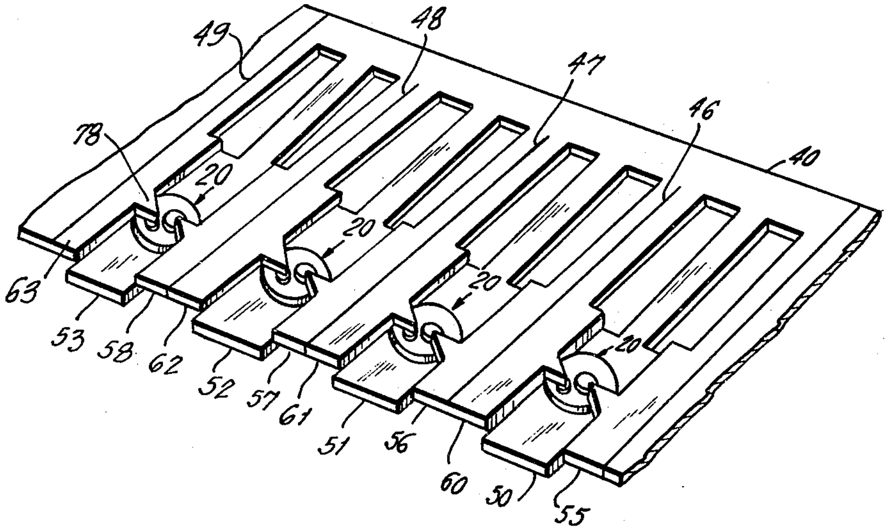
FIGURE 6 shows the strip of FIGURES 4 and 5 in perspective view with the wafers contained in position on the strip.

In accordance with the invention, the devices, such as device 20, to have contacts connected thereto, are first provided with tinned layers atop contacts 25, 26 and 27. Similarly, strip 40 may be pre-tinned. The wafers are then inserted between the segments of each group of segments, as shown in FIGURE 6. As shown in FIGURE 6, the bottom contact 25 of wafers 20 seat directly on central segments 50 to 53, which are sprung downward with respect to their adjacent segments. Tips 70 to 73 of segments 55 to 58, respectively, are then disposed directly in contact with the cathode electrodes 26 of devices 20, while tips 75 to 78 of segments 60 to 63 engage gate electrodes 27 of devices 20. Note that the central segments 50 to 53 will be bent down sufficiently with respect to their side segments due to the thickness of devices 20 so that there is no contact between the central segments and the side segments (except at the common bottom portion of strip 40).

The wafers are then placed in a soldering furnace and held at about 350° C. for about five minutes to solder the electrodes of devices 20 to their contacts.

Figure 7:
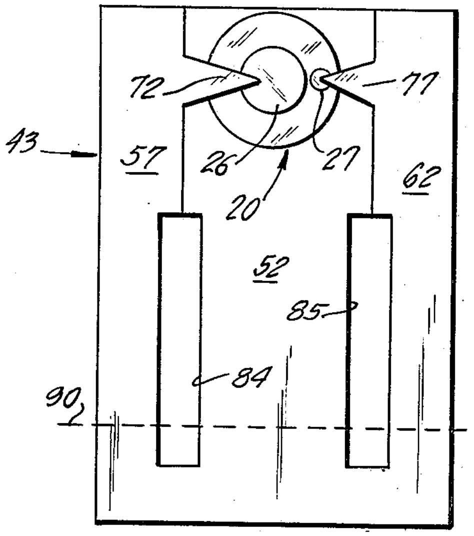
FIGURE 7 is a top view of one of the groups of elements of FIGURE 6.
Figure 8:
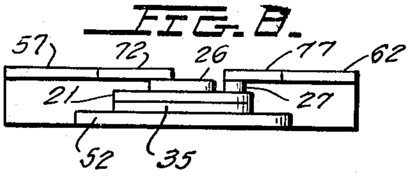
FIGURE 8 is a top view of FIGURE 7.

FIGURES 7 and 8 show an enlarged view of group 43 after this procedure. Note dotted line 90 which indicates the line of shearing for separating the devices from one another and completing the insulation between segments 57, 52 and 62 after the soldering operation, and, if desired, a subsequent encapsulating operation is performed on each of the devices.

Figure 9:
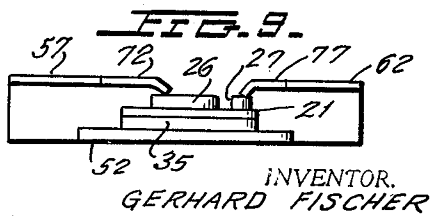
FIGURE 9 is a top view similar to FIGURE 8 where the tangs of the side elements are downwardly bent.

FIGURE 9 illustrates that tips 72 and 77 may be bent downward to improve the connection to electrodes 26 and 27.

The strip of FIGURE 6 may then be inserted in a suitable mold and the portion of the strip, carrying devices 20, is encapsulated with a suitable compound. After curing of the compound, the strip is separated into individual components by cutting the strip along line 90 of FIGURE 7, and by cutting through encapsulating material spanning across cuts 46 to 49. If desired, cuts 40 to 49 can have an increased width to prevent such spanning of encapsulating material.

Figure 10:
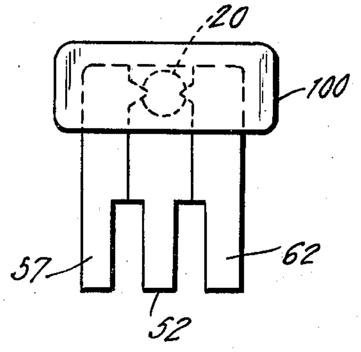
FIGURE 10 shows a single device cut from the device of FIGURE 6 after soldering, encapsulation and separation from the strip.

The completed individual device is then as shown in FIGURE 10 with three extending, insulated leads 57, 52, 62 (for the device formed from group 43) with an encapsulated body 100 enclosing and protecting device 20.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination a semiconductor wafer having a first contact electrode on a bottom surface thereof and second and third spaced contact electrodes on the top surface thereof, and a contact structure for making contact to said first, second and third electrodes; said contact structure formed of a thin, flat spring of conductive material comprised of a central segment and first and second segments adjacent the opposite sides of said central segment; said first and second segments each being bent upwardly and out of the plane of said central segment; said first and second segments having first and second lateral projections on the sides thereof extending toward one another from the sides thereof adjacent the sides of said central segment; said first contact electrode of said wafer secured across the upper surface of said central segment; said first and second projections engaging the top of said second and third electrodes, respectively.

2. The combination of claim 1 wherein said segments are jointed together by a common web at the end of said segments and extending perpendicular to said segments.

3. The combination of claim 2 wherein the opposite ends of said segments are out of electrical contact with one another and said opposite ends and said wafer are encapsulated in an insulation bead.

4. The combination of claim 2 which further includes a plurality of groups of said central and adjacent segments and a semiconductor wafer for each of said groups; each of said groups of segments formed in a common elongated sheet of thin spring wire; each of said groups of segments being laterally disposed with respect to one another and joined by said common web.

5. The combination of claim 4 wherein the opposite ends of said segments are out of electrical contact with one another and said opposite ends and said wafer are encapsulated in an insulation bead.

References Cited

UNITED STATES PATENTS

| | | | |
|---|---|---|---|
| 2,744,308 | 5/1956 | Loman | 29—25.3 |
| 2,795,745 | 6/1957 | Huard | 317—235 |
| 2,869,053 | 1/1959 | Schaper | 317—235 |
| 2,894,183 | 7/1959 | Fermanian | 317—235 |

JOHN W. HUCKERT, Primary Examiner

R. F. POLISSACK, Assistant Examiner

U.S. Cl. X.R.

317—235